(12) United States Patent
Takano

(10) Patent No.: US 8,469,844 B2
(45) Date of Patent: Jun. 25, 2013

(54) ENGINE WITH CHAIN TENSIONER

(75) Inventor: Kiyohito Takano, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 210 days.

(21) Appl. No.: 12/979,738

(22) Filed: Dec. 28, 2010

(65) Prior Publication Data
US 2012/0160193 A1    Jun. 28, 2012

(51) Int. Cl.
*F16H 7/08*    (2006.01)

(52) U.S. Cl.
USPC .......................................................... 474/111

(58) Field of Classification Search
USPC ......................................... 474/111, 101, 121
See application file for complete search history.

(56) References Cited

U.S. PATENT DOCUMENTS

| | | | |
|---|---|---|---|
| 5,199,395 A * | 4/1993 | Mizumura et al. ...... | 123/196 AB |
| 5,772,191 A * | 6/1998 | Nakano et al. ................ | 267/289 |
| 8,216,101 B2 * | 7/2012 | Numajiri ....................... | 474/138 |

FOREIGN PATENT DOCUMENTS

JP    2002-89636    3/2002

* cited by examiner

*Primary Examiner* — William E Dondero
*Assistant Examiner* — Diem Tran
(74) *Attorney, Agent, or Firm* — Wenderoth, Lind & Ponack, L.L.P.

(57) ABSTRACT

An engine includes a case member, a guide member disposed so as to make contact with an endless transmission belt, one end section of the guide member being swingably supported on the case member and the other end section of the guide member a free end, and a chain tensioner for pressing the free end of the guide member to apply tension to the endless transmission belt. The chain tensioner includes an accommodating concave section disposed in the case member, wherein an outer side of the accommodating concave section in a direction parallel to the axis of rotation of the drive shaft has an opening section, and also includes an elastic member being accommodated in the accommodating concave section to press the guide member and a lid member covering the opening section of the accommodating concave section in the direction of the axis of rotation of the drive shaft.

13 Claims, 7 Drawing Sheets

ENGINE WITH CHAIN TENSIONER

BACKGROUND OF THE INVENTION

1. Field of the Invention

The present invention relates to an engine mounted on a vehicle, such as a utility vehicle.

2. Description of the Prior Art

In engines mounted on various vehicles, such as a utility vehicle, a mechanism is provided in which an endless transmission belt, such as a chain, is stretched between a drive sprocket for a crankshaft journaled on a crankcase and a driven sprocket secured to driven shafts, such as a camshaft and a pump drive shaft, journaled on the crankcase, and the power of the crankshaft is transmitted to the driven shafts, such as the camshaft and the pump drive shaft.

FIG. 7 shows an outline of a winding power transmission unit 200 in which a conventional chain 206 is used. In FIG. 7, the chain 206 is stretched between a drive sprocket 202 secured to a crankshaft and a driven sprocket 204 secured to a pump shaft. When the drive sprocket 202 is rotated counterclockwise as shown in the figure, the upper section 206a of the chain 206 is stretched and becomes a tension side, and the lower section 206b is released and becomes a loose side.

The winding power transmission unit 200 shown in FIG. 7 is equipped with a chain guide 208 for applying tension to the lower section 206b (loose side) of the chain 206. One end section 208a of the chain guide 208 is swingably supported on the wall section 211 of the crankcase 210 in the vicinity of the lower section of the driven sprocket 204, and the other end section 208b of the chain guide 208 becomes a free end. The chain guide 208 extends along the lower section 206b on the loose side. Furthermore, a chain tensioner 220 is disposed below the other end section 208b of the chain guide 208, and the pressing piece 224 of the chain tensioner 220 presses the other end section 208b of the chain guide 208 toward the lower section 206b of the chain 206.

The chain tensioner 220 shown in FIG. 7 is equipped with a nearly cylindrical housing 222, the pressing piece 224 slidably loaded inside the housing 222, and a coil spring 226 for biasing the pressing piece 224 toward the lower section 206b of the chain 206. The housing 222 of the chain tensioner 220 shown in FIG. 7 has a flange section 232, has a male screw section 234 above the flange section 232 and has a hexagon bolt-shaped head section 228 below the flange section 232. Furthermore, in the wall section 211 of the crankcase 210, a female screw hole 214 screw-engaged with the male screw section 234 of the flange section 232 is formed. The chain tensioner 220 shown in FIG. 7 is screwed to the wall section 211 of the crankcase 210 via an O-ring 230 disposed between the flange section 232 of the housing 222 and the wall section 211 of the crankcase 210.

The chain tensioner 220 according to the conventional technology shown in FIG. 7 is equipped with a plurality of components, such as the pressing piece 224, and requires the O-ring 230 for allowing the chain tensioner 220 to be installed in the wall section 211 of the crankcase 210 in a hermetically sealed state, whereby the number of components is large and the cost is raised. Furthermore, it is necessary to form a machined seat for allowing the chain tensioner 220 to be screwed to the wall section 211 of the crankcase 210 while ensuring hermetic sealing inside the crankcase 210. In other words, it is necessary to form the male screw section 234 of the flange section, to form the female screw hole 214 in the wall section 211 of the crankcase 210 and to form a flat section for allowing the O-ring 230 to perform sealing.

Hence, there are problems, such as cost increase due to increase in processing man-hour and high susceptibility to design restrictions.

In addition, a guide mechanism in which a plurality of guide units for guiding the traveling of a ring-shaped belt stretched between at least two rotation shafts while applying tension to the ring-shaped belt are connected mutually in a swingable state is disclosed as another conventional example in Japanese Patent Application Laid-open Publication No. 2002-89636.

The guide mechanism disclosed in Japanese Patent Application Laid-open Publication No. 2002-89636 requires a connection structure for connecting the plurality of guide units. Hence, there are problems that the overall structure of the guide mechanism becomes large and it becomes difficult to securely obtain sufficient installation space for the guide mechanism and that the installation of the guide mechanism is complicated.

SUMMARY OF THE INVENTION

Accordingly, the technical problem to be solved by the present invention is to provide an engine equipped with a chain tensioner having a small number of components, being capable of reducing cost and having a simple mounting structure.

MEANS FOR SOLVING PROBLEM

For the purpose of solving the above-mentioned technical problem, the present invention provides an engine equipped with a drive rotation member secured to a drive shaft journaled on a case member; a driven rotation member secured to a driven shaft journaled on the case member; an endless transmission belt wound between the drive rotation member and the driven rotation member; a guide member disposed so as to make contact with the endless transmission belt, one end section of which is swingably supported on the case member and the other end section of which is a free end; and a chain tensioner for pressing the free end of the guide member to apply tension to the endless transmission belt, wherein the chain tensioner has an accommodating concave section disposed in the case member and having an opening section on the outside in the direction of the drive shaft; an elastic member passing through the opening section and being accommodated in the accommodating concave section to press the guide member toward the endless transmission belt; and a lid member for covering the opening section of the accommodating concave section.

With the above-mentioned configuration, since the elastic member directly presses the guide member, the number of components and the processing man-hour relating to the pressing structure can be reduced. More specifically, since the O-ring and the screw-locking machined seat required to install the chain tensioner in a hermetically sealed state in the conventional technology can be eliminated, the cost can be reduced, and the design freedom relating to the arrangement of the chain tensioner is improved.

It is preferable that the above-mentioned engine has the following configuration. In other words, in the engine, the elastic member is a coil spring, and the guide member has a protruding section formed on the face on the side of the chain tensioner and engaged with the inside space of the coil spring.

With the above-mentioned configuration, the coil spring accommodated in the accommodating concave section can be prevented from being detached and displaced.

In the engine, the protruding section has a tapered shape.

Although the protruding section can be formed into, for example, a cylindrical shape having ridge lines extending in parallel, with the above-mentioned configuration, the coil spring can be bent and deformed in response to the swinging of the guide member more significantly.

In the engine, when the elastic member is accommodated in the accommodating concave section, the clearances in the movement direction of the endless transmission belt are determined so as to be wider than the clearances in a direction approximately orthogonal to the movement direction of the endless transmission belt.

With the above-mentioned configuration, since the coil spring can be bent and deformed significantly in the movement direction of the endless transmission belt, the coil spring can provide an appropriate tension to the endless transmission belt being traveling.

In the engine, the lid member is secured to the case member.

Although the function of the lid member can be included in the cover member for covering the case member, with the above-mentioned configuration, the opening section of the accommodating concave section can be covered securely.

In the engine, the cover member has a structure of holding the joint section of an oil pipe in the direction of the drive shaft.

With the above-mentioned configuration, since the lid member serves to cover the opening section of the accommodating concave section and to hold the joint section of the oil pipe, the number of components can be reduced.

In the engine, the driven shaft is a pump driving shaft for driving an oil pump and/or a cooling water pump.

Although the driven shaft may be a cam driving shaft, a cam driving intermediate shaft, etc., with the above-mentioned configuration, the accommodating concave section and the opening section can be formed easily, and excellent installation performance can be provided for the elastic member and the lid member.

DETAILED DESCRIPTION OF THE PREFERRED EMBODIMENTS

An engine 20 according to an embodiment of the present invention will be described below in detail referring to FIGS. 1 to 5.

Figure 1:
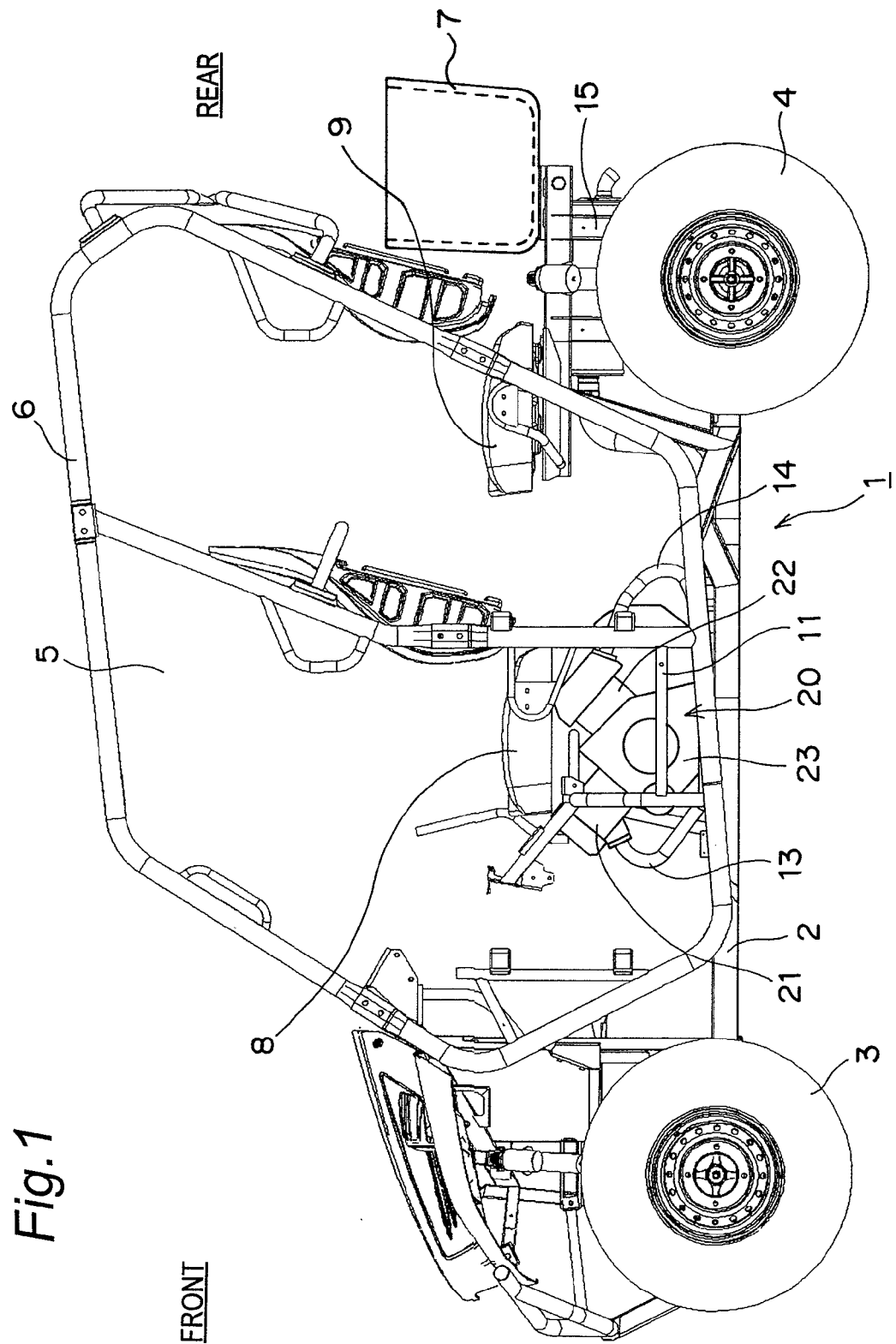
FIG. 1 is a left side view showing a utility vehicle equipped with an engine according to an embodiment of the present invention.

FIG. 1 is a left side view showing a utility vehicle 1 shown as an example of a vehicle. This utility vehicle 1 is used for leisure and hunting in fields and mountains, for travel on golf courses, for maintenance of golf courses and for other purposes. The front, rear, left and right referred to in this specification are based on the front, rear, left and right of the vehicle.

In FIG. 1, the utility vehicle 1 is equipped with a vehicle body 2 supported by a pair of left and right front wheels 3 and a pair of left and right rear wheels 4. A cabin frame (ROPS) 6 enclosing a cabin (riding space) 5 is provided in the intermediate section of the vehicle body 2 in the front-rear direction. On the rear side of the cabin frame (ROPS) 6, a luggage carrier 7 is provided. The cabin frame 6 is generally referred to as ROPS, which is an abbreviation for rollover protective structure.

A front seat 8 securely installed in the front section inside the cabin 5 usually extends in the left-right direction to the vicinities of both the left and right ends of the cabin 5. Hence, two people can sit side by side; the driver can sit in one of seating areas (for example, the left side), and a passenger can sit in the other seating area. Under the front seat 8, an engine box 11 for accommodating the engine 20 is disposed. Like the front seat 8, a rear seat 9 disposed in the rear section inside the cabin 5 extends in the left-right direction to the vicinities of both the left and right ends of the cabin 5. Hence, two passengers can sit side by side.

The engine 20 is a two-cylinder overhead camshaft V-type engine and is equipped with a forward-leaning front cylinder 21, a backward-leaning rear cylinder 22 and a crankcase 23 serving as a case member. An exhaust pipe 13 connected to the front lower face of the front cylinder 21 is bent leftward and extends backward. An exhaust pipe 14 connected to the rear upper face of the rear cylinder 22 extends nearly directly backward and downward, then slightly extends forward, further extends to the rear side of the vehicle body, and merges with the exhaust pipe 13. Both the exhaust pipes 13 and 14 are connected to one exhaust muffler 15 disposed at the rear end section of the vehicle. The output of the engine 20 is transmitted to the rear wheels 4 or all the wheels 3 and 4 via a drive shaft, a chain, etc., not shown, to drive and rotate the rear wheels 4 or all the wheels 3 and 4, thereby providing propulsion power to the utility vehicle 1.

Figure 2:
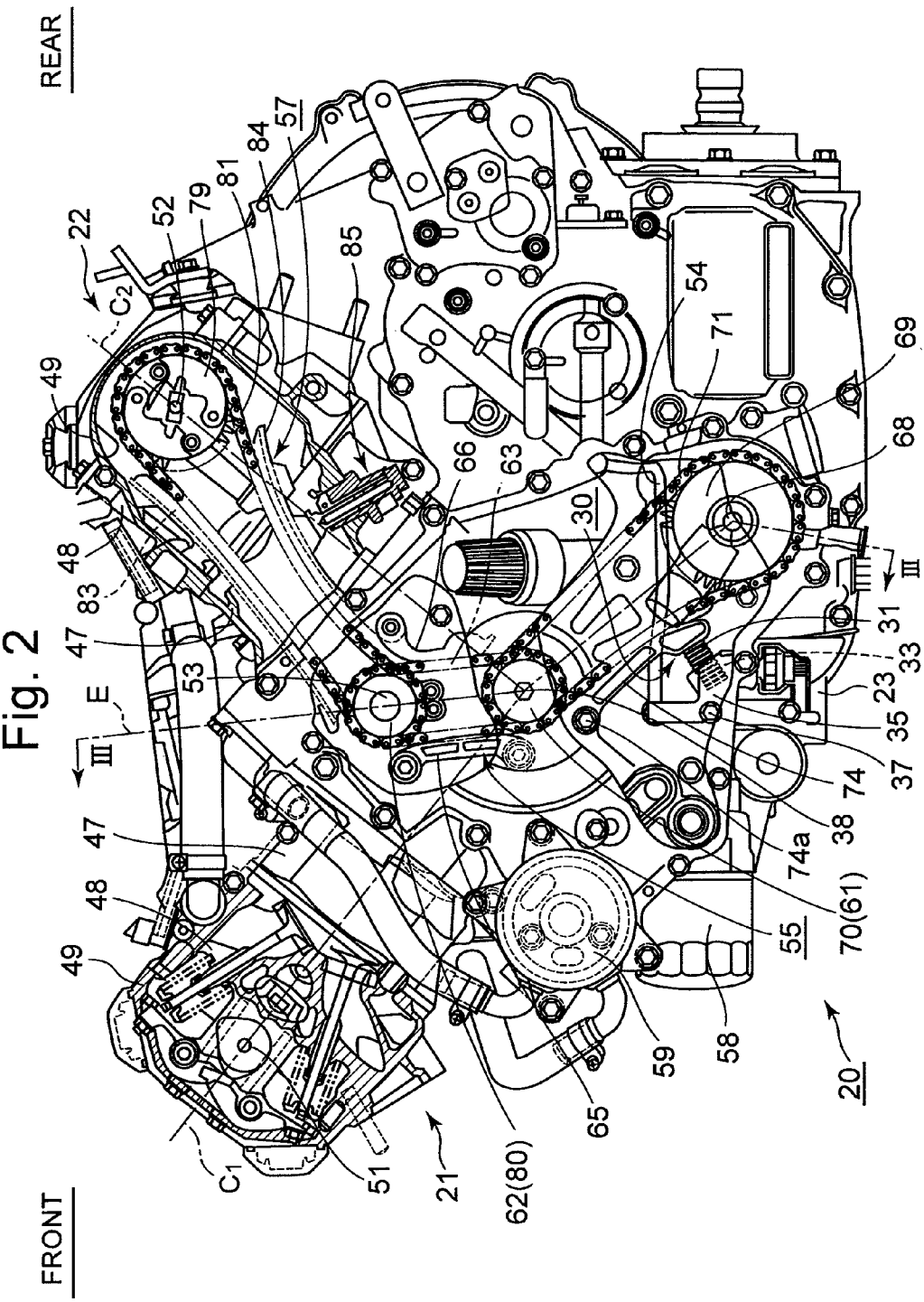
FIG. 2 is a partially cutaway enlarged left side view of the engine shown in FIG. 1.

FIG. 2 is a partially cutaway enlarged left side view of the engine 20 shown in FIG. 1. The front cylinder 21 and the rear cylinder 22 are each constructed by sequentially fastening a cylinder 47, a cylinder head 48 and a cylinder head cover 49 to the crankcase 23, and valve-driving camshafts 51 and 52 are each provided in each of the cylinder heads 48. A crankshaft 38 serving as a drive shaft and a cam driving intermediate shaft 53 serving as a driven shaft and disposed above the crankshaft 38 and on a V-bank center line E are respectively journaled on the crankcase 23. The cam driving intermediate shaft 53 is connected to the crankshaft 38 via a cam driving intermediate chain mechanism 55. The camshaft 51 of the front cylinder 21 is connected to the cam driving intermediate shaft 53 via a cam driving chain mechanism (not shown) at a speed reduction ratio of 1:2. The camshaft 52 of the rear cylinder 22 is connected to the cam driving intermediate shaft 53 via a cam driving chain mechanism 57 at a speed reduction ratio of 1:2.

The cam driving intermediate chain mechanism 55 is accommodated in a generator chamber 60 (shown in FIG. 3) formed on the left side of the crankcase 23 and is formed of a drive sprocket 61 (overlapped with a drive sprocket 70 described later and thus invisible in FIG. 2) secured to the crankshaft 38; an intermediate sprocket 62 secured to the left end of the cam driving intermediate shaft 53; and a cam driving intermediate chain 63 serving as an endless transmission belt and wound between both the sprockets 61 and 62. With this configuration, the power is transmitted from the crankshaft 38 to the cam driving intermediate shaft 53 at a speed reduction ratio of 1:1. A chain guide 65 is disposed on the tension side (front side) of the cam driving intermediate chain 63, and a guide shoe 66 is disposed on the loose side (rear side) thereof. A tensioner (not shown) is provided for the guide shoe 66.

The cam driving chain mechanism 57 for the rear cylinder 22 is formed of a cam sprocket 79 secured to the camshaft 52 of the rear cylinder 22 and serving as a driven shaft; an intermediate sprocket 80 secured to the cam driving intermediate shaft 53 and serving as a drive shaft, and overlapped with the intermediate sprocket 62 and thus invisible in FIG. 2; and a rear cylinder cam chain 81 wound between both the sprockets 79 and 80 and serving as an endless transmission belt. Furthermore, the power is transmitted from the cam driving intermediate shaft 53 to the camshaft 52 of the rear cylinder 22 at a speed reduction ratio of 1:2. The front upper side of the rear cylinder cam chain 81 is its tension side and the rear lower side thereof is its loose side. A chain guide 83 is provided on the tension side. A guide shoe 84 rotatable around a fulcrum, not shown, and an automatic tensioner 85 for biasing the guide shoe 84 toward the chain are disposed on the loose side. The automatic tensioner 85 is a ratchet-type automatic tensioner formed of, for example, a rack, a ratchet pawl, a spring, etc. The automatic tensioner 85 is inserted into the rear lower wall of the cylinder 47 of the rear cylinder 22 from the rear lower side and secured with bolts or the like.

On the right side of the engine 20, the cam driving chain mechanism (not shown in FIG. 2) for the front cylinder 21 is also configured so as to be substantially similar to the above-mentioned cam driving chain mechanism 57 for the rear cylinder 22.

A pump driving chain mechanism 30 is formed of a drive sprocket 70 disposed on the left side of the drive sprocket 61 and secured to the crankshaft 38; a pump driving sprocket 69 secured to a pump driving shaft 68; and a pump driving chain 71 wound between both the sprockets 69 and 70 and serving as an endless transmission belt, whereby the power is transmitted from the crankshaft 38 serving as a drive shaft to the pump driving shaft 68 serving as a driven shaft at a speed reduction ratio of approximately 1:8. The upper section 71a (shown in FIG. 4) of the pump driving chain 71 is its tension side, and the lower section 71b (shown in FIG. 4) thereof is its loose side. On the loose side, a guide member 74 rotatable around a fulcrum 74a and a chain tensioner 75 for biasing the guide member 74 toward the chain are disposed. The chain tensioner 75 is constructed by inserting a coil spring 31 into an accommodating concave section 33 provided in the left wall 23a of the crankcase 23, by covering the opening section 33a (not shown in FIG. 2 but shown in FIG. 4) of the accommodating concave section 33 with a lid member 35 and by securing the lid member 35 with a bolt 37 as described later in detail.

Figure 3:
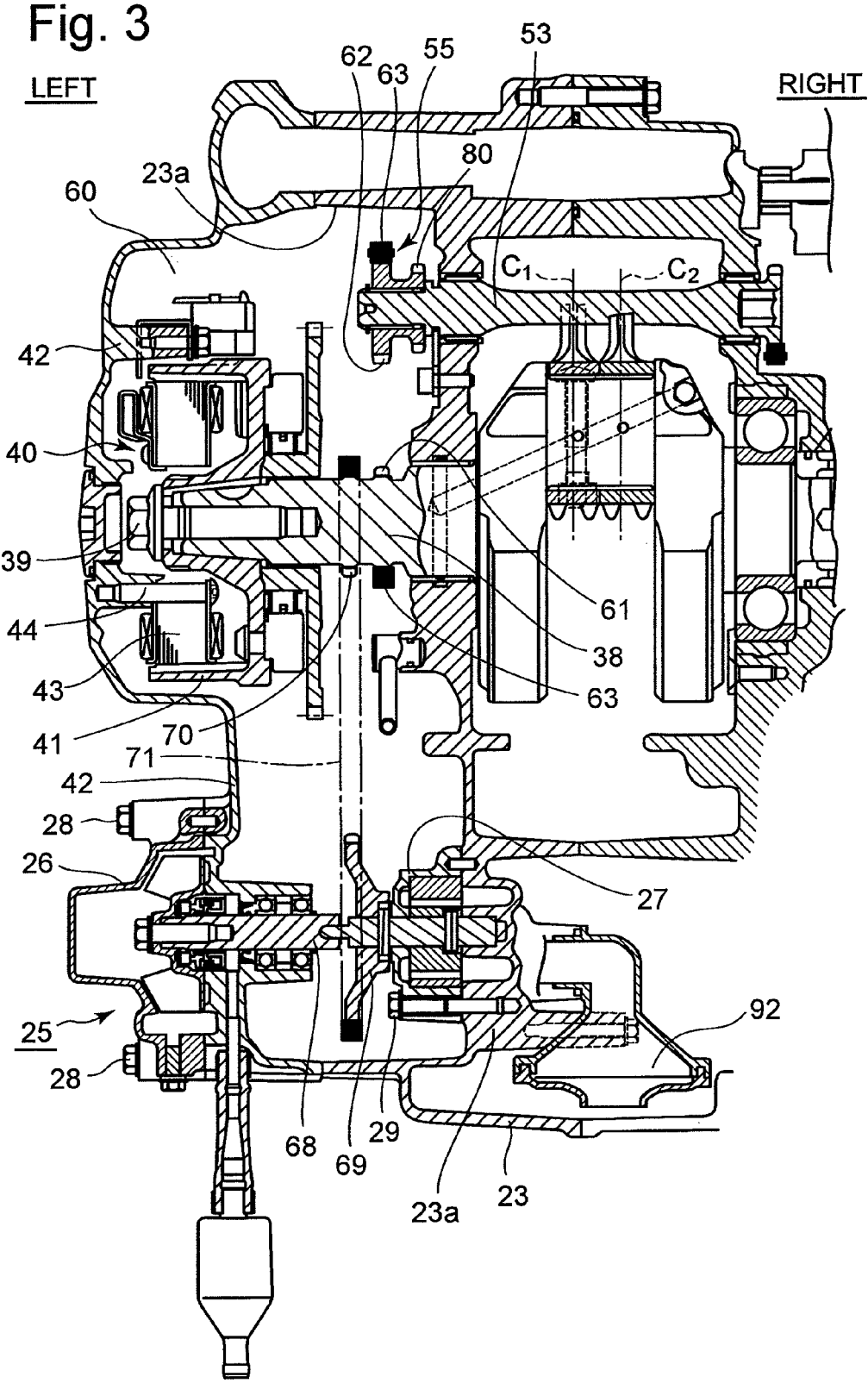
FIG. 3 is a cross-sectional view taken on line of FIG. 2.

FIG. 3 is a cross-sectional view taken on line of FIG. 2 and shows the inside of the space enclosed by the crankcase 23 and a generator cover 42. In FIG. 3, the cylinder center line C1 of the front cylinder 21 is positioned on the left side of the cylinder center line C2 of the rear cylinder 22. The intermediate sprocket 80 is provided at the left end section of the cam driving intermediate shaft 53 serving as a drive shaft. In addition, as shown in FIG. 2, the rear cylinder cam chain 81 passes through a chain tunnel (not shown) and is wound around the cam sprocket 79, thereby driving the camshaft 52 (driven shaft) of the rear cylinder 22.

The cam driving intermediate chain mechanism 55 is disposed on the further left side of the intermediate sprocket 80 and at the left end section of the cam driving intermediate shaft 53. In the cam driving intermediate chain mechanism 55, the cam driving intermediate chain 63 is wound between the drive sprocket 61 of the crankshaft 38 serving as a drive shaft and the intermediate sprocket 62 of the cam driving intermediate shaft 53 serving as a driven shaft, and the cam driving intermediate chain 63 drives the cam driving intermediate shaft 53.

In FIG. 2, the pump driving chain mechanism 30 is disposed on the further left side of the drive sprocket 61 and close to a generator 40. In the pump driving chain mechanism 30, the pump driving chain 71 is wound between the drive sprocket 70 of the crankshaft 38 serving as a drive shaft and the pump driving sprocket 69 of the pump driving shaft 68 serving as a driven shaft, and the pump driving chain 71 drives the pump driving shaft 68.

The generator cover 42 is fastened to the left wall 23a of the crankcase 23 with a plurality of bolts (not shown), and the generator cover 42 hermetically seals the generator chamber 60. The generator 40 is accommodated in the generator chamber 60 provided on the left side of the crankshaft 38 rotatably supported on the crankcase 23. The rotor 41 of the generator 40 is secured to the left end section of the crankshaft 38 with a screw member 39, and the stator coil 43 of the generator 40 is secured to the right inside face of the generator cover 42 with screw members 44.

In FIG. 3, a pump unit 25 driven by the pump driving shaft 68 is disposed below the generator 40. The pump unit 25 is equipped with a cooling water pump 26 for transferring cooling water to the engine 20 and an oil pump 27 for transferring lubricating oil to the engine 20, etc. The cooling water pump 26 is, for example, a centrifugal pump. Furthermore, the oil pump 27 is, for example, a trochoid pump. The pump driving shaft 68 is journaled on the crankcase 23 in nearly parallel with the crankshaft 38. At the left end section of the pump driving shaft 68, the cooling water pump 26 is fastened to the outside face of the generator cover 42 with a plurality of bolts 28. In addition, at the right end section of the pump driving shaft 68, the oil pump 27 is fastened to the left wall 23a of the crankcase 23 with a plurality of bolts 29.

On the pump driving shaft 68, the pump driving sprocket 69 is secured to the position between the cooling water pump 26 and the oil pump 27. In the above-mentioned configuration, the power of the engine 20, i.e., the rotation of the crankshaft 38, is transmitted to the pump driving shaft 68 via the drive sprocket 70 of the crankshaft 38, the pump driving chain 71 and the pump driving sprocket 69, thereby integrally rotating the cooling water pump 26 and the oil pump 27. The cooling water pump 26 or the oil pump 27 may serve as the pump unit 25 that is driven by the pump driving shaft 68. The oil discharged from the oil pump 27 is supplied to the rotating sections, the sliding sections, etc. of the engine 20 via a primary oil filter 92 shown in FIG. 3 and a secondary oil filter 58 and a water-cooling oil cooler 59 shown in FIG. 2 and then returned to an oil pan (not shown) provided below the crankcase 23. The cooling water delivered from the cooling water pump 26 also passes through the water-cooling oil cooler 59 to cool the water-cooling oil cooler 59.

Figure 5:
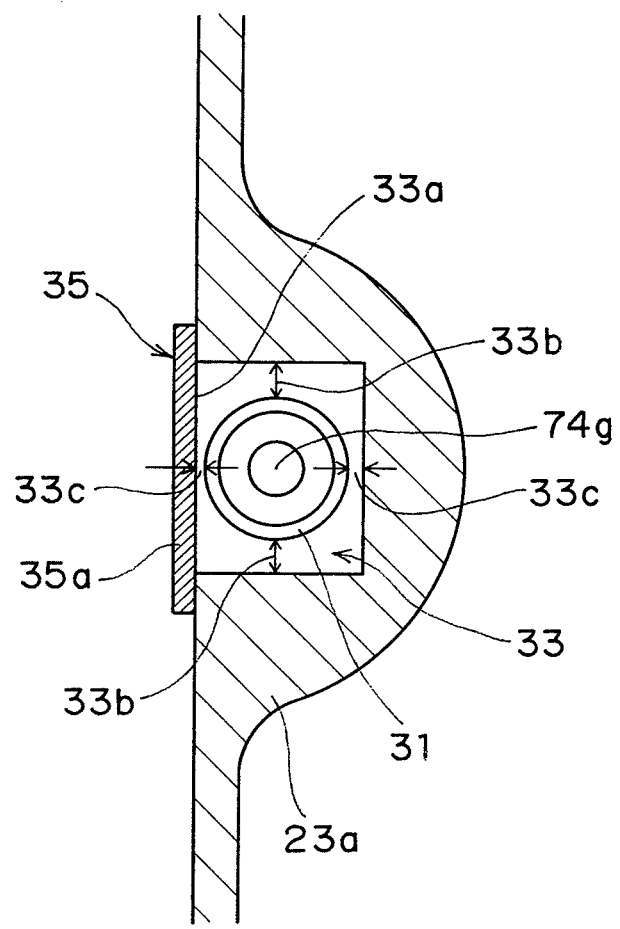
FIG. 5 is a schematic cross-sectional view taken on line V-V of FIG. 4.
Figure 6:
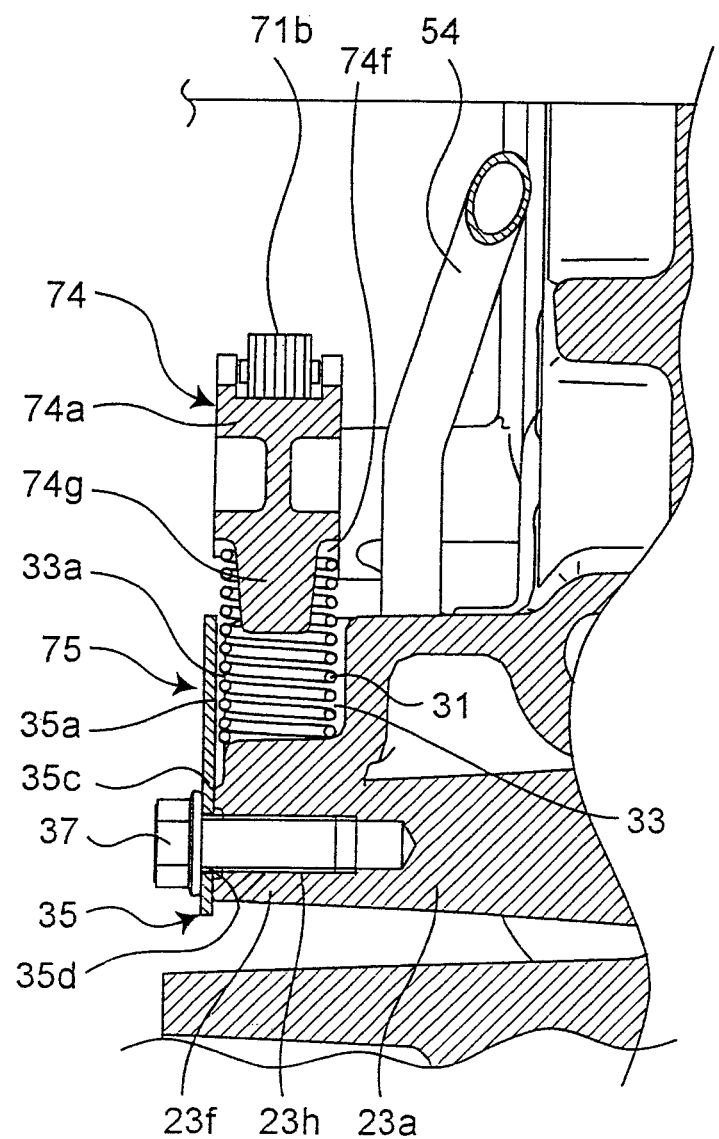
FIG. 6 is a partially cutaway cross-sectional view taken on line VI-VI of FIG. 4.
Figure 7:
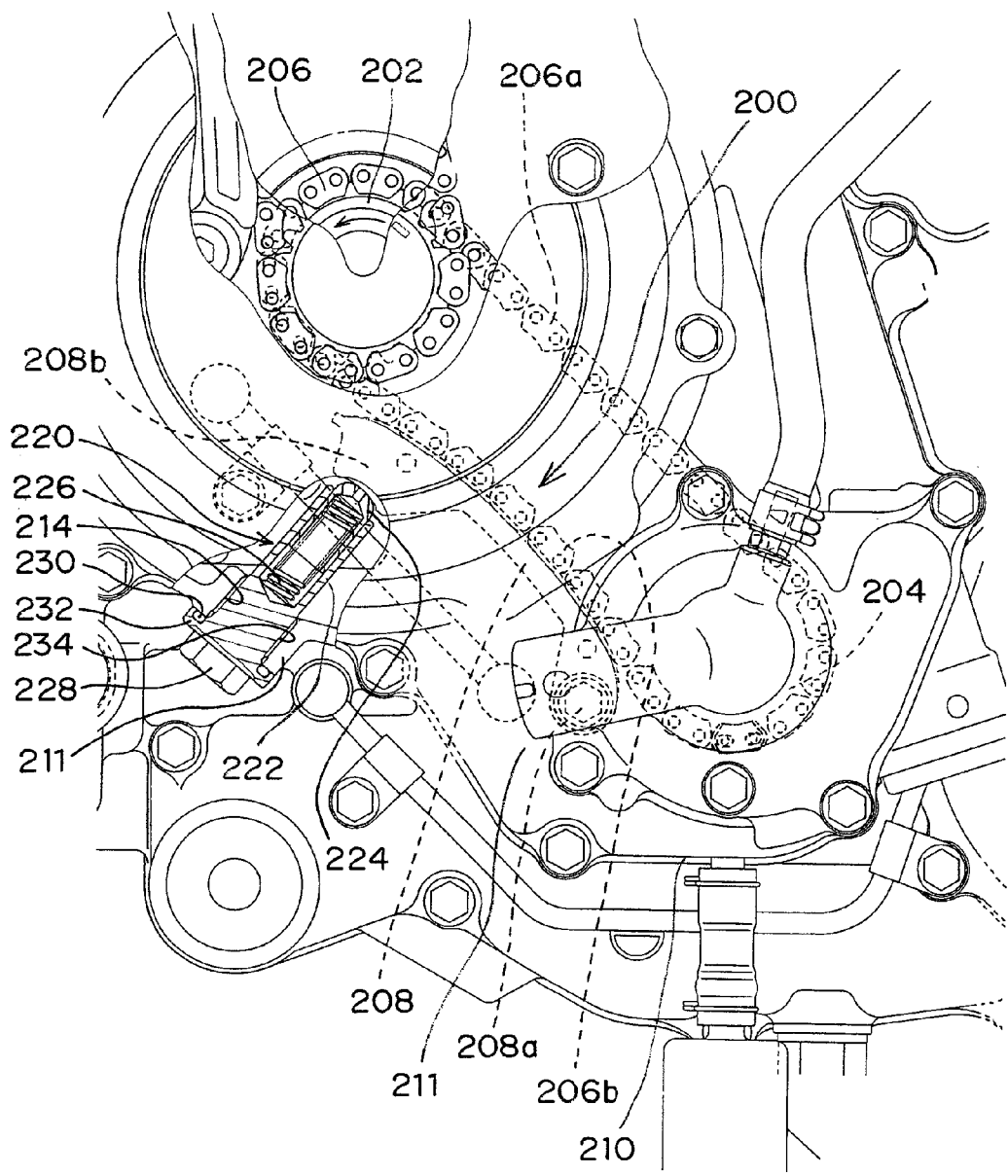
FIG. 7 is a partially cutaway enlarged left side view of the engine according to the conventional example.

Next, the pump driving chain mechanism 30 will be described below in detail referring to FIGS. 4 to 6.

Figure 4:
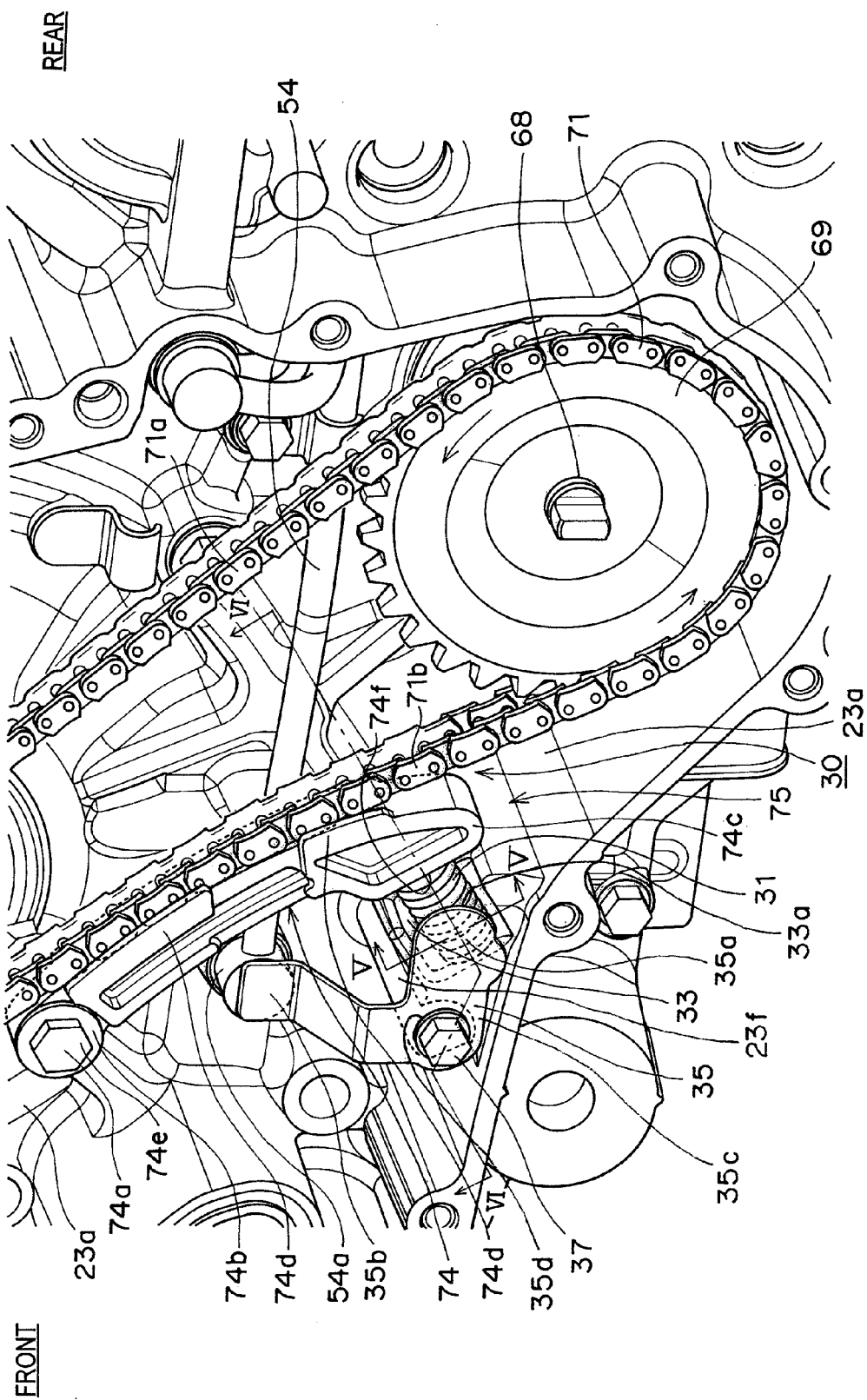
FIG. 4 is an enlarged perspective view illustrating a pump driving chain mechanism in the engine shown in FIG. 2.

FIG. 4 is an enlarged perspective view illustrating the pump driving chain mechanism 30 in the engine 20 shown in FIG. 2, and the drive sprocket 70 secured to the crankshaft 38 shown in FIG. 2 is not shown in FIG. 4. Furthermore, FIG. 5 is a schematic cross-sectional view taken on line V-V of FIG. 4, and FIG. 6 is a partially cutaway cross-sectional view taken on line VI-VI of FIG. 4.

The crankshaft 38 (not shown in FIG. 4 but shown in FIG. 2) and the pump driving shaft 68 are designed to rotate counterclockwise. The upper section 71a of the pump driving chain 71 is its tension side going to the crankshaft 38, and the lower section 71b of the pump driving chain 71 is its loose side going to the pump driving shaft 68.

The pump driving chain mechanism 30 is formed of the drive sprocket 70 of the crankshaft 38, the pump driving sprocket 69 of the pump driving shaft 68, and the pump driving chain 71 wound between both the sprockets 69 and 70 as described above.

The guide member 74 makes pressure contact with the lower section 71b (loose side) of the pump driving chain 71. The guide member 74 extends from its front end section 74b to its rear end section 74c along the lower section 71b of the pump driving chain 71. The front end section 74b of the guide member 74 is pivoted by a pivot bolt 74e so as to be rotatable around the fulcrum 74a at the left wall 23a in the vicinity of the lower section of the drive sprocket 70 (not shown in FIG. 4 but shown in FIGS. 2 and 3) of the crankshaft 38. The rear end section 74c of the guide member 74 is positioned in the vicinity of the lower section of the pump driving sprocket 69. The guide member 74 ranging from its front end section 74b to its rear end section 74c is equipped with a guide 74d for guiding the lower section 71b of the pump driving chain 71. The rear end section 74c of the guide member 74 is bent downward so as to be away from the lower section 71b of the pump driving chain 71.

The upper end section of the coil spring (elastic member) 31 accommodated in the accommodating concave section 33 makes pressure contact with a pressing seat 74f formed on the lower face of the rear end section 74c of the guide member 74. The pressing seat 74f is equipped with a protruding section 74g (shown in FIG. 5) protruding in a direction nearly orthogonal to the seating face of the pressing seat 74f and engaging with the upper inside space of the coil spring 31. By virtue of the engagement between the protruding section 74g and the upper inside space of the coil spring 31, the coil spring 31 accommodated in the accommodating concave section 33 can be prevented from being detached and displaced inadvertently. Although the protruding section 74g (shown in FIGS. 5 and 6) may have a cylindrical shape, it is preferable that the lower end of the protruding section 74g should have a tapered shape. The lower end of the protruding section 74g has a tapered shape, such as a cone shape or a truncated cone shape (shown in FIG. 6), for example. By virtue of the tapered shape of the lower end of the protruding section 74g, the coil spring 31 can be bent and deformed in response to the swinging of the guide member 74 more significantly. The protruding amount of the protruding section 74g is determined so that the protruding section 74g is engaged with the upper inside space of the coil spring 31 and so that the coil spring 31 is not detached inadvertently from the accommodating concave section 33.

The chain tensioner 75 is equipped with the accommodating concave section 33, the coil spring (elastic member) 31, and the lid member 35. The accommodating concave section 33 is formed in the left wall 23a located close to the pump driving sprocket 69. An opening section (not shown in FIG. 4) through which the upper section of the coil spring 31 protrudes toward the lower section 71b of the pump driving chain 71 is provided in the upper section of the accommodating concave section 33. The opening section 33a is provided on the side face of the accommodating concave section 33 on the side opposite to the generator cover 42 (not shown in FIG. 4 but shown in FIG. 3). The opening section 33a receives the lower section of the coil spring 31 so that the coil spring 31 is loaded in an inside direction nearly parallel with the crankshaft 38 (not shown in FIG. 4 but shown in FIG. 2) and the pump driving shaft 68. The accommodating concave section 33 has a rectangular shape in cross-section as shown in FIG. 5. Furthermore, the coil spring 31 has a ring shape in cross-section as shown in FIG. 5. Moreover, when the coil spring 31 sits on the accommodating concave section 33 while the protruding section 74g is engaged with the upper inside space of the coil spring 31, the clearances around the coil spring 31 accommodated in the accommodating concave section 33 are determined so that clearances 33b in the movement direction of the lower section 71b of the pump driving chain 71 become wider than clearances 33c in a direction approximately orthogonal to the movement direction of the lower section 71b of the pump driving chain 71.

The lid member 35 for covering the opening section 33a of the accommodating concave section 33 in which the coil spring 31 is loaded is disposed in the vicinity of the accommodating concave section 33. As shown in FIG. 4, the lid member 35 is equipped with a lid section 35a and a pressing section 35b and has a generally L-shaped bent shape. A bolt insertion hole 35d is formed at an intersection 35c at which the lid section 35a intersects with the pressing section 35b. The lid member 35 is secured to the installation section 23f of the left wall 23a by screwing the bolt 37 (i.e. fastener 37) into the screw hole 23h (shown in FIG. 6) of the installation section 23f formed in the left wall 23a. The lid section 35a covers the opening section 33a of the accommodating concave section 33 so that the coil spring 31 being compressed does not come off from the opening section 33a. The pressing section 35b has a step shape protruding in the inward direction of the drive shaft, thereby pressing the joint section 54a of an oil pipe 54 in the inward direction of the drive shaft.

The chain tensioner 75 is installed in the accommodating concave section 33 disposed in the left wall 23a of the crankcase 23 according to the following procedure. First, the protruding section 74g (shown in FIGS. 5 and 6) protruding from the pressing seat 74f formed on the rear end section 74c of the guide member 74 is inserted into the upper inside space of the coil spring 31 being compressed, whereby the coil spring 31 being compressed is loaded into the accommodating concave section 33. Since the upper section of the coil spring 31 being compressed is engaged with the protruding section 74g of the guide member 74 at this time, the coil spring 31 being compressed can be stably held in the accommodating concave section 33, even if the opening section 33a of the accommodating concave section 33 is not covered with the lid section 35a of the lid member 35. The lid member 35 is positioned so that the lid section 35a covers the opening section 33a of the accommodating concave section 33 and so that the pressing section 35b presses the joint section 54a of the oil pipe 54 in the inward direction of the drive shaft. Then, the lid member 35 is secured to the installation section 23f of the left wall 23a by screwing the bolt 37 into the screw hole 23h (shown in FIG. 6) of the installation section 23f via the bolt insertion hole 35d of the lid member 35.

The chain tensioner 75 biases the lower section 71b (loose side) of the pump driving chain 71 toward the upper section 71a (tension side) via the guide member 74, thereby being capable of applying appropriate tension to the lower section 71b of the pump driving chain 71. The coil spring 31 can be easily inserted into and removed from the accommodating concave section 33 by simply removing the generator cover 42 shown in FIG. 3. Furthermore, since the coil spring 31 directly presses the guide member 74, the number of components and the processing man-hour relating to the chain tensioner 75 can be reduced. Moreover, since the chain tensioner 75 is accommodated in the crankcase 23, the components and processes relating to the sealing structure for installing the chain tensioner 75 in a hermetically sealed state can be eliminated, and the cost can be reduced. Still further, since the sealing structure for installing the chain tensioner 75 in the hermetically sealed state is not required, the design freedom relating to the arrangement of the chain tensioner 75 is improved.

Although an embodiment according to the present invention has been described specifically, the scope of the present invention is not limited to the above-mentioned configuration. For example, the mechanism for transmitting the rotation of the crankshaft 38 to the pump driving shaft 68 is not limited to the chain mechanism formed of the pump driving chain 71 and the sprockets 69 and 70 but may be a belt-pulley mechanism formed of a belt and pulleys. Furthermore, the chain tensioner 75 is not limited to be applied to the pump driving chain mechanism 30 but may also be applied to the above-mentioned cam driving chain mechanisms for the front cylinder 21 and the rear cylinder 22 and to the above-mentioned cam driving intermediate chain mechanism 55. Moreover, the inside face of the generator cover 42 for covering the left wall 23a of the crankcase 23 may be configured so as to have the function of the lid member 35 formed of the lid section 35a and the pressing section 35b.

The luggage carrier 7 of the utility vehicle 1 can be configured according to the needs of the user so as to be extendable forward so that the widths or capacities of the space of the luggage carrier 7 and the space occupied by passengers can be used to the greatest extent. The engine 20 according to the present invention can also be applied to this type of utility vehicle 1.

In addition, although an example in which the engine 20 according to the present invention is mounted on the utility vehicle 1 is described as a preferred embodiment, the engine 20 according to the present invention can also be applied to off-road four-wheel vehicles, motorcycles, etc.

What is claimed is:

1. An engine comprising:
   a case member;
   a drive shaft journaled on the case member;
   a drive rotation member secured to the drive shaft;
   a driven shaft journaled on the case member;
   a driven rotation member secured to the driven shaft;
   an endless transmission belt connected to the drive rotation member and the driven rotation member;
   a guide member disposed so as to make contact with the endless transmission belt, one end section of the guide member being swingably supported on the case member and the other end section of the guide member a free end; and
   a chain tensioner for pressing the free end of the guide member to apply tension to the endless transmission belt,
   wherein the chain tensioner includes:
   (i) an accommodating concave section disposed in the case member, wherein an outer side of the accommodating concave section in a direction parallel to an axis of rotation of the drive shaft has an opening section;
   (ii) an elastic member being accommodated in the accommodating concave section to press the guide member toward the endless transmission belt; and
   (iii) a lid member covering the opening section of the accommodating concave section in the direction of the axis of rotation of the drive shaft.

2. The engine according to claim 1, wherein the elastic member is a coil spring, and the guide member has a protruding section formed on a face on a side of the chain tensioner and engaged with an inside space of the coil spring.

3. The engine according to claim 2, wherein the protruding section has a tapered shape.

4. The engine according to claim 1, wherein a clearance between the elastic member and the case member in a movement direction of the endless transmission belt being wider than a clearance between the elastic member and the case member in a direction approximately orthogonal to the movement direction of the endless transmission belt.

5. The engine according to claim 1, wherein the lid member is secured to the case member.

6. The engine according to claim 1, further comprising an oil pipe having a joint section,
   wherein the lid member holds the joint section of the oil pipe in the direction of the axis of rotation of the drive shaft.

7. The engine according to claim 1, wherein the driven shaft is a pump driving shaft for driving an oil pump and/or a cooling water pump.

8. The engine according to claim 1, wherein the accommodating concave section is formed by an indentation in a side wall of the case member, and
   wherein a clearance of the elastic member is formed between the case member and the elastic member.

9. The engine according to claim 1, wherein the lid member has a face which confines the elastic member and which faces in a direction parallel to the axis of rotation of the drive shaft.

10. The engine according to claim 1, wherein the lid member is secured to the case member by a fastener which is spaced apart from the accommodating concave section.

11. The engine according to claim 10, wherein the elastic member is a coil spring, and the opening section of the accommodating concave section is disposed outwardly of the coil spring in a radial direction of the coil spring, and
    wherein the lid member faces in the radial direction of the coil spring.

12. The engine according to claim 1, wherein the elastic member is a coil spring, and the opening section of the accommodating concave section is disposed outwardly of the coil spring in a radial direction of the coil spring, and
    wherein the lid member faces in the radial direction of the coil spring.

13. The engine according to claim 1, further comprising a pump,
    wherein the driven shaft drives the pump.

* * * * *